June 17, 1930.  W. R. MITTENDORF  1,764,274
BALANCING MECHANISM
Filed Dec. 15, 1922   2 Sheets-Sheet 2
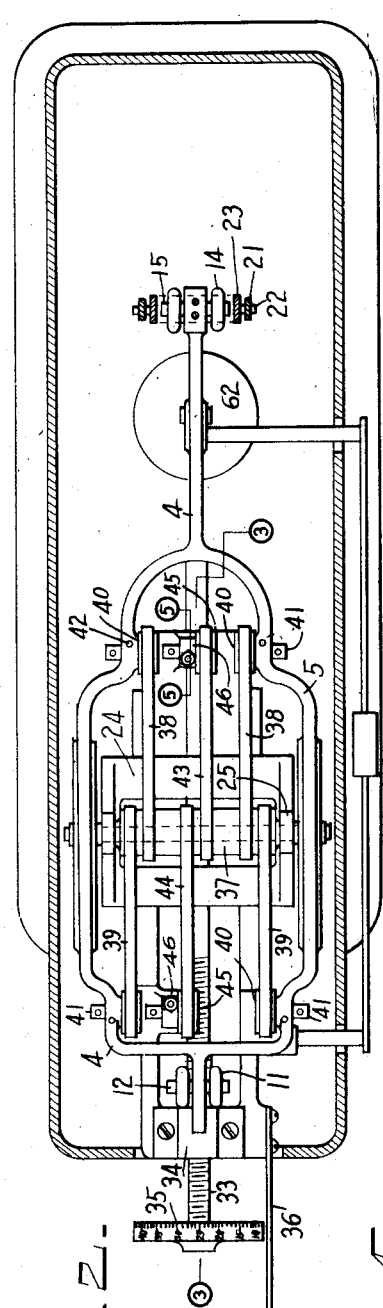
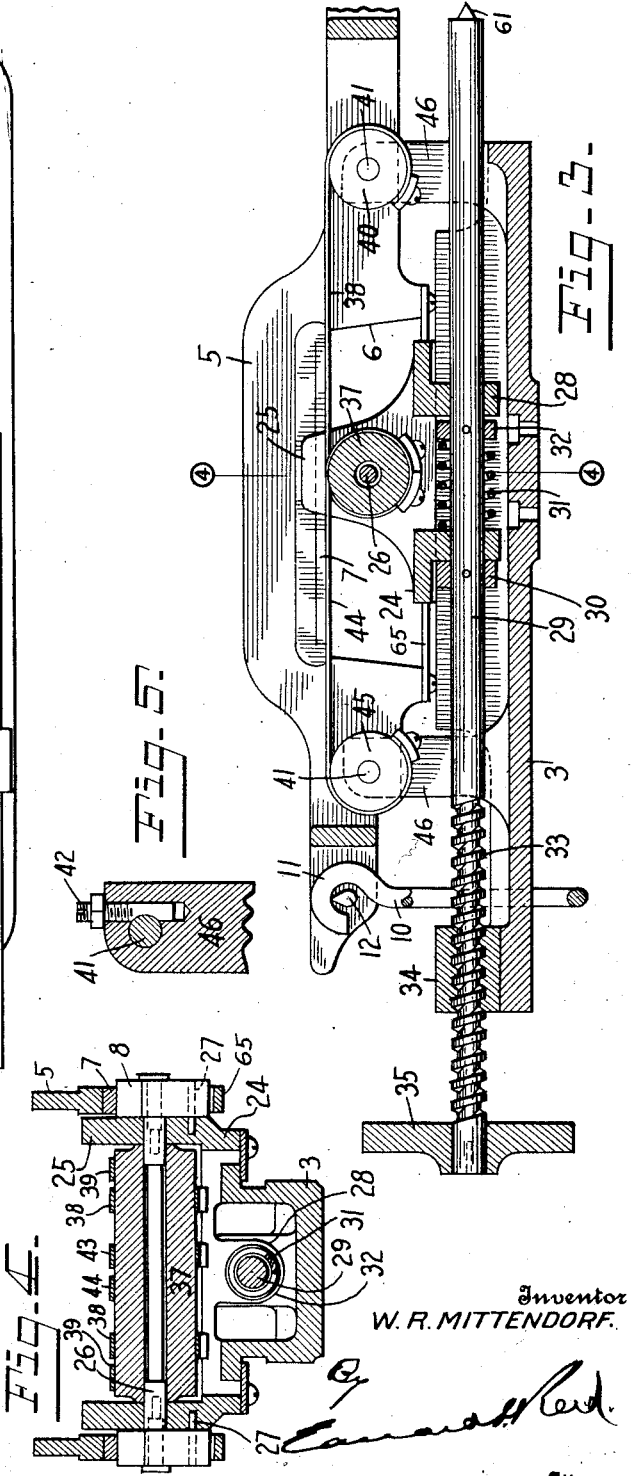
Inventor
W. R. MITTENDORF.
Attorney Patented June 17, 1930

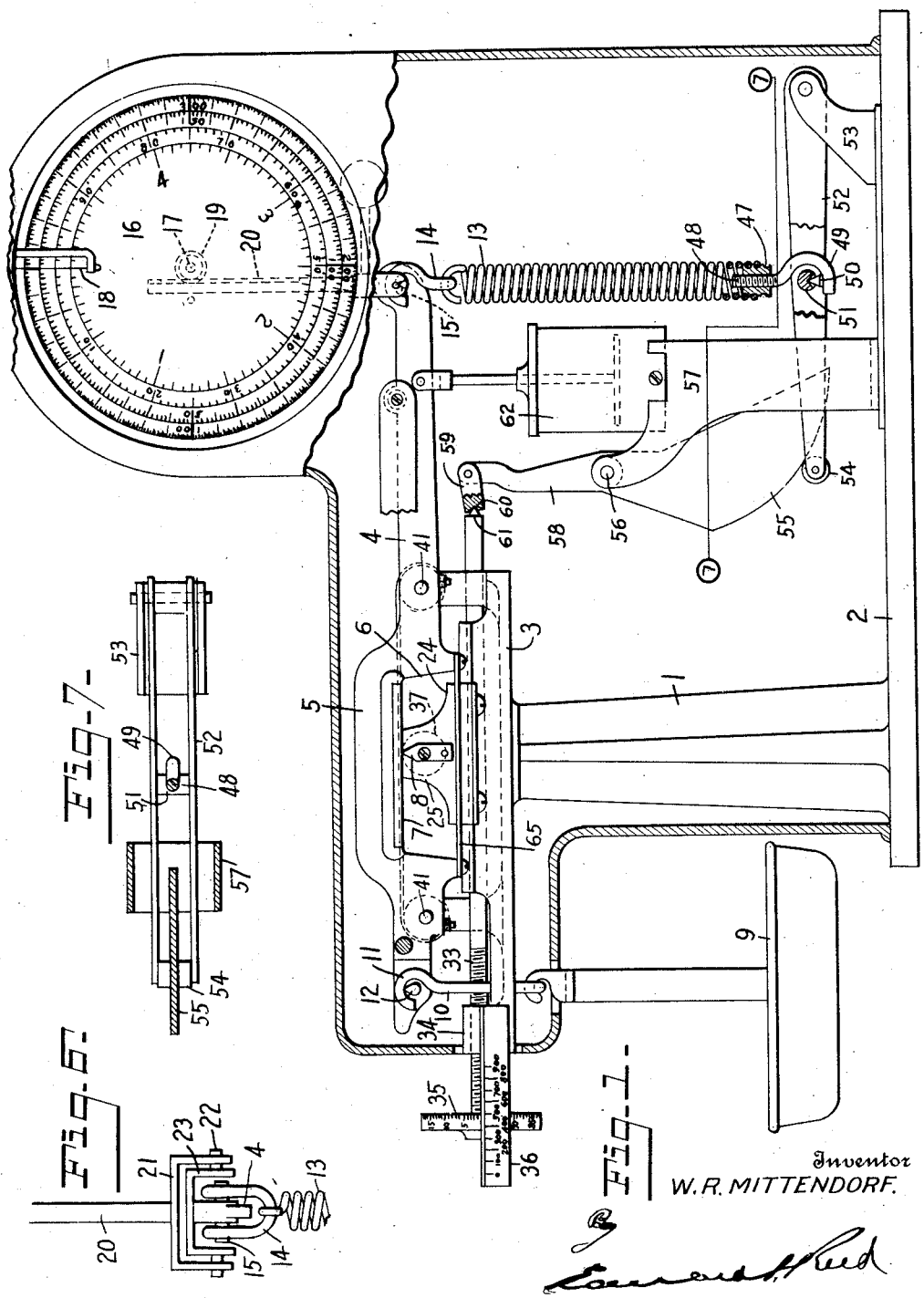

1,764,274

UNITED STATES PATENT OFFICE

WILLIAM R. MITTENDORF, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

BALANCING MECHANISM

Application filed December 15, 1922. Serial No. 607,207.

This invention relates to balancing mechanism, such as computing scales, and more particularly to such a computing scale designed to count duplicate parts or articles.

One object of the invention is to provide an automatic computing balancing mechanism in which the value of the unit of computation may be varied by varying the multiplication of leverage in such a manner that the responsiveness of the mechanism will not be disturbed by the operation of changing the leverage, thereby enabling the indicating elements to be used as a gauge for establishing the value of the unit.

A further object of the invention is to provide a balancing mechanism in which the multiplication of the leverage may be varied by changing the relative position of the axis of a lever in said mechanism.

A further object of the invention is to provide such a mechanism with means for holding the lever positively against longitudinal movement without interfering with the free movement of the lever about its axis.

A further object of the invention is to provide such a mechanism with automatic counterbalancing means to compensate for changes in the initial load and in the distribution of the metal in the lever due to the change in the position of the axis with relation to the lever so that the zero balance of the lever will not be affected by the change in the relative position of the axis.

A further object of the invention is to provide such a mechanism which will be simple in its construction, positive in its operation and easily manipulated.

Other objects of the invention will appear as the mechanism is described in detail.

In the accompanying drawings Fig. 1 is a side elevation of a balancing mechanism embodying my invention, with the casing partly in section; Fig. 2 is a plan view of such a mechanism; Fig. 3 is a section taken on line 3—3 of Fig. 2; Fig. 4 is a section taken on the line 4—4 of Fig. 3; Fig. 5 is a detail view of the locking device for one of the tension devices for the flexible connecting members; Fig. 6 is an end elevation of the lever showing the connections between the same and the counterbalancing spring and the indicator; and Fig. 7 is a section taken on the line 7—7 of Fig. 1.

In these drawings I have illustrated one embodiment of my invention and have shown the same as embodied in a scale comprising a single lever of the first principle which is provided on one side of its axis with a load receptacle, or pan, and on the other side thereof with a counterbalance. It will be understood, however, that the invention may take various forms and may be applied to scales or balancing mechanisms of various kinds.

In the form here illustrated the mechanism comprises a supporting structure consisting of a standard 1 mounted on a base 2 and having at its upper end an elongated head or platform 3. A single lever 4, of the first order, is mounted upon the supporting structure, the lever and the supporting structure being provided with cooperating pivot members about the axis of which the lever moves. One of these pivot members is movable relatively to the lever to shift the axis about which the lever moves. In the present construction, the lever is provided with an elongated bearing having a flat bearing surface which rests upon a pivot member adjustably mounted upon the head or platform 3 of the supporting structure. The lever, as here shown, is provided between its ends with a yoke shaped portion consisting of parallel side members 5 each of which is provided at its lower side with a recess 6 in which is mounted a bearing. The bearing may be of any suitable character but is here shown as an elongated slab of agate having its lower surface perfectly flat, and when the lever is in its zero balanced position, in a horizontal plane. The pivot members upon which the bearing 7 rests are here shown as knife edge or tapered pivot blocks 8. These pivot members may be provided with sharp knife edges if desired, but this is not necessary as the device will function satisfactorily upon a dull pivot member.

The lever 4, which is thus pivotally mounted on a transverse axis arranged between its ends, has connected therewith, at one end thereof, a load receptacle or pan 9 which is supported from a yoke 10 having hook shaped portions 11 engaging knife edge pivots 12 on the end of the lever. The other end of the lever is provided with a counterbalance which may be of any suitable character but, in the present instance, consists of a spring 13 which is connected with the lever by means of hook shaped members 14 engaging over knife edge pivot points 15 carried by the lever. Also connected with the last mentioned end of the lever is an indicator to indicate the computation which has been effected by this balancing mechanism. This result or computation may be expressed by any suitable means, but as here shown, I have utilized an indicating device and the particular device here shown, comprises a disk or dial 16 having on its face three series of graduations for indicating the number of units on the load receptacle, the second series having twice the number of graduations that the first series has, and the third series having twice the number of divisions that the second series has. If desired, a fourth series of graduations may be provided for indicating weight in pounds and ounces. This dial rotates about a central axis 17 in such a manner that all four series of graduations are carried past a fixed reading line or wire 18. The dial may be operatively connected with the lever in any suitable manner but, as here shown, it is provided with a pinion 19 with which meshes a toothed rack 20 which is pivotally connected with the lever. The point of connection of the rack with the lever is preferably coincident with the axis upon which the counterbalance is connected with the lever so that there will be no variation between the movement of the counterbalance and the indicator. This is accomplished in the present instance, by securing the rack to a yoke shaped member 21 having bearing openings which receive pivot pins 22 carried by a second yoke shaped member 23 rigidly secured to the lever with the pivot pins 22 in alinement with the pivot pins 15.

In utilizing the apparatus as a counting scale a single unit, or article, of the kind to be counted, is placed in the load receptacle and this moves the indicator a distance corresponding to the weight of the unit. In order that the count may be accurately computed on the indicator it is necessary that the first graduation of some one of the several series of counting graduations on the indicator should register with the reading line when the single unit is on the load receptacle. When the first graduation of one series does register with the reading line it will be apparent that the indicator will be moved the distance of one graduation for each additional article of like kind which is placed on the load receptacle, and therefore, that when a mass of articles has been placed in the load receptacle the indication on the particular series of graduations on which the computation is being made will indicate the exact number of articles in the load receptacle. The chart, however, has but a limited number, in the present instance three, series of counting graduations and the unit or articles to be counted may be of any weight within the difference in capacity between one graduation of the coarse series and one graduation of the fine series and consequently it very often happens that the weight of the single unit on the load receptacle will not cause the first graduation of any series of graduations to register with the reading line. In order to bring about this registration I propose to change the multiplication of the lever by shifting the axis about which the lever moves, and as has been stated the pivot members 8 of the present device, are movable lengthwise of the lever, these pivot members having sliding contact with the flat bearing surface of the lever. As here shown the pivot members or fulcrums 8 are mounted on a carriage 24 which is slidably mounted on the head or platform 3 of the supporting structure. These pivot blocks or fulcrums may be mounted on the carriage in any desired manner but the present carriage is provided with upright side walls 25 in which is mounted a shaft 26 the end portions of which extend beyond the walls 25 and form supports for the pivot blocks, which are mounted on the ends thereof and are held rigidly against rotation by pins 27 which extend through the same and into the walls 25 of the carriage. Various mechanism may be provided for moving the carriage on the supporting structure and thus adjusting the pivot block with relation to the lever so as to change the pivot point or axis of the lever. In the present mechanism the carriage comprises transverse members or flanges 28 having openings in which is mounted a rod 29. This rod is rotatable in the openings in the carriage and is held against longitudinal movement in one direction with relation to the carriage by a collar 30 rigidly secured to the rod and bearing on the outer side of one of the flanges or parts 28 of the carriage. A spring 31 confined between the inner side of the same part 28 and a second collar 32, also rigidly secured to the rod, holds the part 28 in firm contact with the collar 30, but the contact between these parts is of a yielding character so that there will be no binding between the parts which might interfere with the free rotation of the rod. The rod is provided with a threaded portion 33 mounted in a fixed nut 34 carried by the head 3 of the supporting structure and the outer end of the rod is provided with a device, such as a knob 35, for rotating the same. The nut 34 being fixed the rotation of the screw therein will impart lengthwise movement to the rod and the rod being held against movement relative to the carriage the latter will be moved with the rod. The amount of movement imparted to the carriage may be determined in any suitable manner and I have shown the knob 35 as provided on its periphery with a series of graduations. Cooperating with these graduations is a plate 36 secured to the supporting structure and arranged parallel with the rod 29 and having its edge adjacent to the periphery of the knob 35. The plate 36 is also graduated, the graduations on the plate being in units of one hundred and the graduations on the knob being in units of one and extending from one to one hundred. The right hand edge of the knob forms an indicator for the graduations on the plate 36 and the upper edge of the plate forms an indicator for the graduations on the knob. The pitch of the screw is such that one complete rotation of the knob 35 will cause the same to move the distance of one graduation on the plate 36. Consequently, by reading the graduations on the plate and then those on the knob the exact position of the lever can be determined in figures. For example, if the right hand edge of the knob 35 registers exactly with the five hundred graduation on the plate and the screw is rotated one quarter of a turn to the left, the figure 75 on the knob would be brought into registration with the upper edge of the plate and the reading on the plate would be 400 and on the knob 35 which would be taken as position 475 for the axis of the lever. When the position of the axis has been determined for a given article or unit of computation the scale can be quickly adjusted for again weighing or counting such articles by adjusting the knob to the desired number.

It is, of course, necessary to the determination and maintenance of the correct multiplication of leverage that the lever shall be held against longitudinal movement. This is usually accomplished by the use of a V-bearing but, in the present apparatus, I am employing a flat bearing to permit of the fulcrum being moved along the same. It is also necessary that the lever should be held against lengthwise movement in a manner which will not interfere with its free pivotal movement about its axis because the lever must be free to move about its axis in order that it may move under the influence of the unit in the load receptacle to actuate the indicator and thus inform the operator when the proper adjustment of the axis has been secured. While this may be accomplished in various ways I have in the present drawings, illustrated one method of holding the lever against lengthwise movement which is very satisfactory, because it is positive and is highly sensitive to the movement of the lever. The device for so holding the lever consists, in the present instance, of a member rotatably mounted on the supporting structure and having a curved peripheral surface. The axis of the rotatable member is spaced from the axis of the lever a distance equal to the radius of the rotatable member and is preferably arranged directly below the axis of the lever. Connected with the rotatable member and extending about the curved surface thereof is a flexible device which may consist of one part or of a plurality of parts, and the end portions of which extend tangently from said rotatable member in opposite directions, lengthwise of the lever, and are connected with the lever at points spaced from the axis thereof. The point or points of tangential contact between the flexible device and the curved surface of the rotatable member are coincident with the axis of the lever. In adapting this device to the present mechanism I have shown the same as consisting of an intermediate member 37 carried by the supporting structure and arranged adjacent to the axis of the lever. Arranged on the opposite sides of the intermediate member 37 and extending lengthwise of the lever are flexible connecting members, here shown as thin metal tapes 38 and 39, there being, in the present instance, two of these tapes on each side of the intermediate member. The tapes on both sides of the intermediate member are connected at their inner ends therewith and at their outer ends with the lever. Various means may be provided for connecting the outer ends of the flexible members or tapes with the lever but the connection is preferably an adjustable one so that the tapes may be drawn taut and maintained in that condition. To this end I have connected the outer end of each tape with the periphery of a disk or button 40 carried by a stud shaft 41 which is rotatably mounted in the lever. Cooperating with the stud shaft of the disk is a locking screw 42 by which the disk may be locked in adjusted positions. The points of contact between the inner ends of the flexible members, 38 and 39, and the intermediate member 37 are in substantial alinement with the axis of the lever and consequently when the lever moves about its axis the tapes will move about their points of contact with the intermediate member without variation of their length and without appreciable resistance to the movement of the lever, thus providing a very sensitive connection which will effectively hold the lever against longitudinal displacement. Further, the flexible members being arranged on opposite sides of the longitudinal center of the lever tend to hold the same against twisting movement. In the present device, in which the axis of the lever is adjustable, the intermediate member 37 is mounted upon the carriage 24 and is, preferably, in the form of a cylinder rotatably mounted on a shaft 26, the shaft having its intermediate portion of reduced diameter so as to provide but small frictional contact between the same and the cylindrical intermediate member. With this construction it is also desirable to connect the intermediate member with fixed parts of the supporting structure and to this end I have provided additional flexible members, 43 and 44, arranged on the opposite sides of the intermediate member and connected at their inner ends therewith and connected at their outer ends with disks or buttons 45 mounted on brackets 46, forming part of the supporting structure, in the same manner that the buttons 40 are mounted on the lever. It will be apparent that with this construction the intermediate member will be caused to rotate about its axis when the carriage is shifted and this rotation of the intermediate member will cause the flexible connecting members on one side thereof to be taken up or wound about the intermediate member while the flexible connecting members on the other side thereof will be paid out or unwound from the intermediate member to an amount exactly equal to the amount that the first mentioned flexible members are taken up. Thus all the flexible members are maintained taut during the adjustment of the axis and the lever is free at all times to move about its axis, but is very positively held against longitudinal movement. Preferably some means are provided to prevent the lever from being lifted upwardly in such a manner as to impose a strain upon the flexible connecting members and, in the present device, I have shown the two arms 5 of the lever as having bars or guards 65 extending across the bottoms of the recesses 6 beneath the lower ends of the pivot blocks 8. The guards are out of contact with the pivot blocks but are arranged sufficiently close thereto to prevent any material vertical movement being imparted to the lever.

The balancing mechanism is, of course, always under an initial load, which is composed of the weight of the load receptacle and the force of the counterbalance therefor. Obviously any shifting of the axis with relation to the lever will disturb the balance of the initial load and throw the lever out of zero balance, or out of seal. Likewise the shifting of the axis with relation to the lever changes the distribution of the metal in the lever with relation to its axis and this also tends to throw the lever out of zero balance or seal. It is therefore desirable that some means be provided for maintaining the lever in zero balance during the adjustment of the axis. In the present construction I have provided means for automatically adjusting the counterbalance according to the adjustment of the axis thus maintaining the lever in zero balance. The automatic adjustment of the counterbalance for maintaining the zero balance of the lever, at any position of the axis, must be accomplished in such a way that such adjustment will not interfere with the action of the counterbalance for the load to be weighed. Preferably the same counterbalance is used for both counterbalancing functions, part of its action being used to maintain the zero balance of the lever and part for counterbalancing the load to be weighed. It will be obvious that counterbalances of various kinds may be used in connection with the lever and that there will necessarily be more or less variation in the method of adjusting the same. In the present mechanism, where I have for the purpose of illustration employed a spring counterbalance, I have connected the adjusting device with that end of the spring opposite the end which is connected with the lever. During the normal operation of the lever the adjusting device forms a fixed point of support for the spring and the spring operates on the lever in the same manner as if the adjusting device were a rigid connection. This adjusting device acts upon this end of the spring to vary the tension thereof in proportion to the amount of movement imparted to the axis of the lever. If the axis is shifted toward the right in Fig. 1 the tension of the spring is increased. If the axis is shifted to the left in Fig. 1 the tension of the spring is relieved. This regulation of the tension of the counterbalancing spring is preferably accomplished automatically and controlled directly by the movement of the axis. The adjustment of the counterbalance may be accomplished in various ways but, in the present instance, I have mounted in the lower end of the counterbalancing spring, a nut or block 47 having a screw threaded aperture in which is mounted a rod 48 having a goose neck 49 which carries a pivot point 50. The pivot point 50 is seated in a bearing recess in a pin 51 extending between the two arms of a lever 52 which is pivoted at one end in brackets 53 carried by the base 2. At its opposite end the lever is provided with a bearing member, such as a roller 54, which engages the edge of a cam 55 pivotally mounted at 56 on brackets 57 mounted on the base 2. This cam is provided with an upwardly extending arm 58 which is connected with the adjustable pivot member, preferably through the medium of the rod 29, by means of which the fulcrum is adjusted. As here shown a link 59 is pivotally connected with the upper end of the arm 58 of the cam and is provided in its end with a seat 60 to receive a pivot point 61 projecting from the adjacent end of the rod 29. The action of the spring 13 on the cam will hold the link 59 firmly in contact with the pivot point 61 but will permit the link to have free movement with relation to the rod, thereby compensating for any variations in the relative positions of the arm 58 and the rod 29. The cam surface of the cam plate 55 is so shaped that it will impart to the lever 52 the movement necessary to so regulate the tension on the spring 13 that the lever would be accurately balanced in all positions of its axis with relation thereto. Preferably the lever is provided with a dash pot 62, any ordinary type, to check the vibration thereof.

If desired the balancing mechanism may also be provided with a tare beam and tare poise for the purpose of compensating for the weight of any receptacle which may be placed upon the load receptacle 9. As shown in Figs. 1 and 2, a tare beam 66 is connected with the lever 4, on opposite sides of its axis and has moutned thereon a tare poise 67 which may be adjusted for this purpose.

The operation of the mechanism will be readily understood from the foregoing description of the several parts thereof and it will be apparent that I have provided a balancing mechanism which may be used in automatic scales of various kinds and in which the multiplication of the leverage of the mechanism may be controlled by shifting the axis of a lever with relation to that lever and that the lever may be held positively against lengthwise movement without in any way interfering with its free movement about its axis and that the balance or seal of the mechanism will be automatically maintained in all positions of the axis with relation to the lever.

It will also be apparent that the mechanism may be used for weighing the load and that the axis may be adjusted to some one position in which the standard weight on the load receptacle will cause the corresponding standard weight to be indicated on the inner or weighing series of indications on the dial. In the present mechanism this position of the axis is position 500, which is the position shown in the drawing. When the axis has been adjusted to a position other than the position 500 for the purpose of counting the number of articles on the load receptacle and it is also desired to ascertain the weight of the mass of articles this is accomplished by first determining the count and then shifting the axis to position 500 in which position the weight indications on the dial will register the weight of the load.

While I have shown and described one embodiment of my invention I wish it to be understood that I do not desire to be limited to the details thereof as various modifications may occur to one skilled in the art.

Having now fully described my invention what I claim as new and desire to secure by Letters Patent, is:

1. In a balancing mechanism, a supporting structure, a load supporting lever having an elongated pivot bearing, a pivot member mounted on said supporting structure adjustable along said pivot bearing and forming the sole support for said lever, and means to hold said lever against lengthwise movement relative to said supporting structure.

2. In a balancing mechanism, a supporting structure, a carriage mounted on said supporting structure, a pivot member mounted on said carriage, a load supporting lever having an elongated pivoted bearing resting upon said pivot member and capable of free pivotal movement thereon, and means for adjusting said carriage to move said pivot member along said pivot bearing.

3. In a balancing mechanism, a supporting structure, a carriage mounted on said supporting structure, a pivot member mounted on said carriage, a load supporting lever having an elongated pivot bearing resting upon said pivot member, means for adjusting said carriage to move said pivot member along said pivot bearing, and means for holding said lever against lengthwise movement relative to said supporting structure without interfering with its free pivotal movement on said pivot member.

4. In a balancing mechanism, a supporting structure, a load supporting lever, a pivot member carried by one of said parts, a bearing for said pivot member carried by the other of said parts, said bearing having a flat bearing surface, and means to hold said lever against lengthwise movement relative to said supporting structure.

5. In a balancing mechanism, a supporting structure, a load supporting lever, a knife edge pivot member carried by one of said parts, a bearing for said pivot member carried by the other of said parts, said bearing having a flat bearing surface, and means to hold said lever against lengthwise movement relative to said supporting structure.

6. In a balancing mechanism, a supporting structure, a lever, cooperating pivot members carried by said structure and said lever, respectively, and serving to support said lever on said structure, and means associated with one of said pivot members to hold said lever against lengthwise movement.

7. In a balancing mechanism, a supporting structure, a lever, cooperating pivot members carried by said structure and said lever, respectively, and serving to support said lever on said structure, means to adjust one of said pivot members relatively to said lever, and means associated with one of said pivot members to hold said lever against lengthwise movement.

8. In a balancing mechanism, a supporting structure, a lever, cooperating pivot members carried by said structure and said lever, respectively, and serving to support said lever on said structure, means to adjust one of said pivot members relatively to said lever, and means associated with the other of said pivot members to hold said lever against lengthwise movement.

9. In a balancing mechanism, a supporting structure, a pivot member carried by said structure, a lever, a pivot member carried by said lever and cooperating with the first mentioned pivot member to support said lever on said structure, and a flexible device connected with said structure at a point coincident with the axis of said lever and connected with said lever on opposite sides of said axis.

10. In a balancing mechanism, a supporting structure, a pivot member carried by said structure, a lever, a pivot member carried by said lever and cooperating with the first mentioned pivot member to support said lever on said structure, a member rotatably mounted on said structure and having a curved surface, and a flexible device connected with said rotatable member and extending tangently from the curved surface thereof at a point in line with the axis of said lever, said flexible device being connected with said lever on opposite sides of said axis.

11. In a balancing mechanism, a supporting structure, a pivot member carried by said structure, a lever, a pivot member carried by said lever and cooperating with the first mentioned pivot member to support said lever on said structure, a cylindrical member rotatably mounted on said structure on an axis spaced from the axis of said lever a distance equal to the radius of said cylindrical member, and a flexible device connected with said cylindrical member, extending tangently therefrom at a point coincident with the axis of said lever and connected with said lever on opposite sides of the axis thereof.

12. In a balancing mechanism, a supporting structure, a lever, a pivot member carried by one of said parts, a bearing for said pivot member carried by the other of said parts, said bearing having a flat bearing surface, and flexible members connecting said lever with said supporting structure and arranged to hold said lever against lengthwise movement without interfering with its pivotal movement.

13. In a balancing mechanism, a supporting structure, a lever, a pivot member carried by one of said parts, a bearing for said pivot member carried by the other of said parts, said bearing having a flat bearing surface, a part carried by said supporting structure and arranged adjacent to said pivot member, and flexible members connecting the last mentioned part with said lever on opposite sides of said pivot member.

14. In a balancing mechanism, a supporting structure, a lever, a pivot member carried by one of said parts, a bearing for said pivot member carried by the other of said parts, said bearing having a flat bearing surface, a normally stationary part carried by said supporting structure, flexible members connected with and extending in opposite directions from the last mentioned part and each connected with said lever, the points of contact between said flexible members and said part being in substantial alinement with the axis of said lever.

15. In a balancing mechanism, a supporting structure, a lever mounted on said structure for movement about a transverse axis, means for adjusting said axis lengthwise of said lever, and a connection between said supporting structure and said lever comprising flexible members to hold said lever against lengthwise movement relative to said supporting structure.

16. In a balancing mechanism, a supporting structure, a lever mounted on said structure for movement about a transverse axis, means for adjusting said axis lengthwise of said lever, an intermediate member adjustable with said axis, and flexible members connecting said intermediate member with said supporting structure and with said lever, to hold said lever against lengthwise movement relative to said supporting structure.

17. In a balancing mechanism, a supporting structure, a lever mounted on said structure for movement about a transverse axis, means for adjusting said axis lengthwise of said lever, a rotatable member adjustable with said axis, a plurality of flexible members arranged on each side of said rotatable member and each connected at one end therewith, a part of said flexible members on each side of said rotatable member being connected at their other ends with said lever, and a part being connected with said supporting structure.

18. In a balancing mechanism, a supporting structure, a lever mounted on said structure for movement about a transverse axis, means for adjusting said axis lengthwise of said lever, a rotatable member adjustable with said axis, a plurality of flexible members arranged on each side of said rotatable member and each connected at one end therewith, a part of said flexible members on each side of said rotatable member being connected at their other ends with said lever, and a part being connected with said supporting structure, and the points of contact between said flexible members and said rotatable member being in line with said axis.

19. In a balancing mechanism, a supporting structure, a lever, a carriage mounted on said structure for adjustment lengthwise of said lever, a pivot member mounted on and movable with said carriage and supporting said lever, a plurality of flexible members arranged on each side of said carriage and having their outer ends connected, respectively with said lever and said supporting structure and having their inner ends connected with said carriage, and means mounted on said carriage for taking up or paying out said flexible members as said carriage is moved from one position to another.

20. In a balancing mechanism, a supporting structure, a lever, a carriage mounted on said structure for adjustment lengthwise of said lever, a pivot pin mounted on and movable with said carriage and supporting said lever, a cylindrical member rotatably mounted on said carriage with the uppermost portion of its peripheral surface in line with the axis of said lever, a plurality of flexible members connected with said cylindrical member and extending across said uppermost part thereof and in opposite directions therefrom, a part of said flexible members on each side of said cylindrical member being mounted with said lever, and a part of said flexible members on each side of said cylindrical member being connected with said supporting structure.

21. In a balancing mechanism, a lever movable about a transverse axis, means for adjusting said axis with relation to said lever, and means for automatically maintaining the balance of said lever in each adjusted position of said axis.

22. In a balancing mechanism, a lever movable about a transverse axis, means for adjusting said axis with relation to said lever, means for holding said lever against lengthwise movement without interfering with its free pivotal movement, and means for automatically maintaining the balance of said lever in each adjusted position of said axis.

23. In a balancing mechanism, a lever movable about a transverse axis, means for adjusting said axis with relation to said lever, a counterbalance connected with said lever, and automatically operated means for adjusting said counterbalance to correspond to the adjusted position of said axis.

24. In a balancing mechanism, a lever movable about a transverse axis, means for adjusting said axis with relation to said lever, a counterbalance connected with one end of said lever, and means controlled by the adjustment of said axis for adjusting said counterbalance.

25. In a balancing mechanism, a lever movable about a transverse axis, means for adjusting said axis with relation to said lever, a counterbalance connected with one end of said lever, means comprising a cam for adjusting said counterbalance, and an operative connection between said cam and the adjusting means for said axis.

26. In a balancing mechanism, a lever movable about a transverse axis, means for adjusting said axis with relation to said lever, a counterbalance connected with said lever, and means acting on said counterbalance independently of its connection with said lever for adjusting said counterbalance.

27. In a balancing mechanism, a lever movable about a transverse axis, means for adjusting said axis with relation to said lever, a counterbalance connected with said lever, and means controlled by the adjustment of said axis for adjusting said counterbalance without disturbing its connection with said lever.

28. In a balancing mechanism, a lever movable about a transverse axis, means for adjusting said axis with relation to said lever without interfering with the free pivotal movement of said lever about said axis, a counter balancing spring connected with said lever, and means acting on said spring independently of its connection with said lever for automatically regulating the tension thereof.

29. In a balancing mechanism, a lever movable about a transverse axis, means for adjusting said axis with relation to said lever without interfering with the free pivotal movement of said lever about said axis, a counter balancing spring connected at one end with said lever, means connected with the other end of said spring for regulating the tension thereof, and means controlled by the adjustment of said axis for actuating said regulating means.

30. In a balancing mechanism, a supporting structure, a lever, cooperating pivot members carried by said structure and said lever, respectively, and serving to support said lever on said structure, means for adjusting one of said pivot members relatively to said lever, a counterbalance connected with said lever, means for adjusting said counterbalance and an operative connection between the adjusting means for said pivot member and the adjusting means for said counterbalance.

31. In a balancing mechanism, a supporting structure, a lever, cooperating pivot members carried by said structure and said lever, respectively, and serving to support said lever on said structure, means to adjust one of said pivot members relative to said lever, means to hold said lever against lengthwise movement relative to said supporting structure, a counterbalance connected with said lever, means for adjusting said counterbalance, and an operative connection between the adjusting means for said pivot member and the adjusting means for said counterbalance.

32. In a balancing mechanism, a supporting structure, a lever, cooperating pivot members carried by said structure and said lever, respectively, and serving to support said lever on said structure, means to adjust one of said pivot members relative to said lever, means to hold said lever against lengthwise movement relative to said supporting structure, a counter balancing spring connected with said lever, means acting on said spring independently of its connection with said lever to regulate the tension thereof, and an operative connection between the means for adjusting said pivot member and the means for regulating the tension for said counter balancing spring.

33. In a balancing mechanism, a supporting structure, a lever, cooperating pivot members carried by said structure and said lever, respectively, and serving to support said lever on said structure, means to adjust one of said pivot members relative to said lever, means to hold said lever against lengthwise movement relative to said supporting structure, a counter balancing spring connected with said lever, a device acting on said spring to regulate the tension thereof, said device comprising a cam, and an operative connection between said cam and the means for adjusting said pivot member.

34. In a balancing mechanism, a supporting structure, a lever, cooperating pivot members carried by said structure and said lever, respectively, and serving to support said lever on said structure, means to adjust one of said pivot members relative to said lever, means to hold said lever against lengthwise movement relative to said supporting structure, a counter balancing spring connected at one end with said lever, a tension regulating lever connected with the other end of said spring, a cam acting on said tension regulating lever, and an operative connection between said cam and the means for adjusting said pivot member.

35. In a balancing mechanism, a supporting structure, a carriage movably mounted on said supporting structure, an actuating device for said carriage, a pivot member mounted on and movable with said carriage, a lever having a flat pivot bearing resting upon said pivot member, means to hold said lever against lengthwise movement, a counterbalance connected with said lever, means for adjusting said counterbalance, and an operative connection between the actuating device for said carriage and the adjusting means for said counterbalance.

36. In a balancing mechanism, a supporting structure, a carriage movably mounted on said supporting structure, an actuating device for said carriage, a pivot member mounted on and movable with said carriage, a lever having a flat pivot bearing resting upon said pivot member, means to hold said lever against lengthwise movement, a counter balancing spring connected with said lever, a cam acting on said spring independently of its connection with said lever to regulate the tension thereof, and an operative connection between said carriage actuating device and said cam.

37. In a balancing mechanism, a lever movable about a transverse axis, means for adjusting said axis with relation to said lever without interfering with the free pivotal movement of said lever about said axis, a counterbalance connected with said lever, means for adjusting said counterbalance to correspond to the position of said axis, and an indicator connected with said lever in line with the point of connection of said counterbalance with said lever.

38. In a balancing mechanism, a lever movable about a transverse axis, means for adjusting said axis with relation to said lever without interfering with the free pivotal movement of said lever about said axis, a counterbalance having a pivotal connection with said lever, means for adjusting said counterbalance to correspond to the position of said axis, an indicator, and an actuating member for said indicator pivotally connected with said lever on an axis coincident with the axis on which said counterbalance is connected with said lever.

39. In a balancing mechanism, a lever held against lengthwise movement and having free pivotal movement about its axis, means for adjusting said axis with relation to said lever, and means automatically operated by said adjusting means for controlling the equilibrium of said lever in all adjusted positions of said axis.

40. In a balancing mechanism, a lever having a pivot bearing, means for adjusting the axis of said lever lengthwise of said lever, means, other than said bearing, for positively retaining said lever in definite lengthwise position, but maintaining at all times its free pivotal action upon said axis, and means controlled by the adjustment of said axis for maintaining the equilibrium of said lever at all positions of said axis.

41. In a balancing mechanism, a lever having a pivot bearing, means for adjusting the axis of said lever lengthwise of said lever, means for registering the adjusted position of said axis, means, other than said bearing, for positively retaining said lever in definite lengthwise position but maintaining at all times its free pivotal action upon said axis, and means for maintaining the equilibrium of said lever at all positions of said axis.

42. In a balancing mechanism, a lever having a pivot bearing, means for adjusting the axis of said lever lengthwise of said lever, means for registering the adjusted position of said axis, means, other than said bearing, for positively retaining said lever in definite lengthwise position but maintaining at all times its free pivotal action upon said axis, means for maintaining the equilibrium of said lever at all positions of said axis, and means for controlling said equilibrium maintaining means by the said axis adjusting means.

43. In a balancing mechanism, a lever having a pivot bearing, means for adjusting the axis of said lever lengthwise of said lever, means for registering the adjusted position of said axis, means, other than said bearing, for positively retaining said lever in definite lengthwise position but maintaining at all times its free pivotal action upon said axis, means for maintaining the equilibrium of said lever at all positions of said axis, means for controlling said equilibrium maintaining means by the said axis adjusting means, and means for counterbalancing a load applied to said lever.

44. In a balancing mechanism, a load supporting lever having a pivot bearing, means for adjusting the axis of said lever lengthwise of said lever, means for registering the adjusted position of said axis, means, other than said bearing, for positively retaining said lever in definite lengthwise position but maintaining at all times its free pivotal action upon said axis, means for maintaining the equilibrium of said lever at all positions of said axis, and means for counterbalancing a load applied to said lever.

45. In a balancing mechanism, a lever having a pivot bearing, means for adjusting the axis of said lever lengthwise of said lever, means for registering the adjusted position of said axis, means, other than said bearing, for positively retaining said lever in definite lengthwise position but maintaining at all times its free pivotal action upon said axis, means for counterbalancing a load applied to said lever, means for controlling said load counterbalancing means to maintain the equilibrium of said lever at all positions of said axis, and means for actuating said controlling means by the adjustment of said axis.

46. In a balancing mechanism, a load supporting lever, means for adjusting the axis of said lever lengthwise of the lever, means for counterbalancing a load applied to said lever, and means for controlling said load counterbalancing means to maintain the equilibrium of said lever at all positions of said axis.

47. In a balancing mechanism, a load supporting lever, means for adjusting the axis of said lever lengthwise of the lever, means for counterbalancing a load applied to said lever, means for controlling said load counterbalancing means to maintain the equilibrium of said lever at all positions of said axis, and means for indicating a characteristic of said load according to a unit of computation as established by the position of said axis.

48. In a balancing mechanism, a load supporting lever having a pivot bearing, means for adjusting the axis of said lever lengthwise of said lever, means, other than said bearing, for positively retaining said lever in definite lengthwise position but maintaining at all times its free pivotal action upon said axis, means for counterbalancing a load applied to said lever, and means for controlling said load counterbalancing means to maintain the equilibrium of said lever at all positions of said axis.

49. In a balancing mechanism, a load supporting lever, means for adjusting the axis of said lever lengthwise of the lever, means for registering the adjusted position of said axis, and means for counterbalancing a load applied to said lever and for maintaining the equilibrium of said lever at all positions of said axis.

50. In a balancing mechanism, a lever, means for adjusting the axis of said lever lengthwise of the lever, means for counterbalancing a load applied to said lever, means for controlling said load counterbalancing means to maintain the equilibrium of said lever at all positions of said axis, and means for actuating said controlling means.

51. In a balancing mechanism, a lever, means for adjusting the axis of said lever lengthwise of the lever, means for counterbalancing a load applied to said lever, means for controlling said load counterbalancing means to maintain the equilibrium of said lever at all positions of said axis, and means for indicating a characteristic of said load according to a unit of computation as established by the position of said axis.

52. In a balancing mechanism, a load supporting lever, means for adjusting the axis of said lever lengthwise of the lever, means for maintaining the equilibrium of said lever at all positions of said axis, and means for registering the adjusted position of said axis.

53. In a balancing mechanism, a lever, means for adjusting the axis of said lever lengthwise of the lever, means for maintaining the equilibrium of said lever at all positions of said axis, and means for controlling said equilibrium maintaining means by the said axis adjusting means.

54. In a balancing mechanism, a lever, load-supporting means and load-counterbalancing means operatively connected through said lever, means for varying the degree of multiplication of said lever to establish a value for a unit of computation, means for indicating the degree of multiplication of said lever, and means for maintaining the zero-balance of said lever at any degree of multiplication.

55. In a balancing mechanism, a lever, load-supporting means and load-counterbalancing means operatively connected through said lever, means for varying the degree of multiplication of said lever to establish a value for a unit of computation, means for indicating the degree of multiplication of said lever, means for maintaining the zero-balance of said lever at any degree of multiplication, and means for indicating the ratio between a characteristic of the load and a relative unit of computation as established by the degree of multiplication of said lever.

56. In a balancing mechanism, a lever, load-supporting means and load counterbalancing means operatively connected through said lever, means for varying the degree of multiplication of said lever to establish a value for a unit of computation, means for indicating the degree of multiplication of said lever, and means for controlling said load-counterbalancing means to maintain the zero-balance of said lever at any degree of multiplication.

57. In a balancing mechanism, a lever, load-supporting means and load-counterbalancing means operatively connected through said lever, means for varying the degree of multiplication of said lever to establish a value for a unit of computation, means for maintaining the zero-balance of said lever at any degree of multiplication, and means for indicating the ratio between a characteristic of the load and a relative unit of computation as established by the degree of multiplication of said lever.

58. In a balancing mechanism, a lever, load-supporting means and load-counterbalancing means each operatively connected to said lever, means for varying the degree of multiplication of said lever to establish a value for a unit of computation, means for maintaining a zero-balance of said lever at any degree of multiplication, and means for controlling said zero-balance maintaining means by said multiplication varying means.

59. In a balancing mechanism, a lever, load-supporting means and load-counterbalancing means each operatively connected to said lever, means for varying the degree of multiplication of said lever to establish a value for a unit of computation, means for indicating the degree of multiplication of said lever, means for maintaining the zero-balance of said lever at any degree of multiplication, and means for controlling said zero-balance maintaining means by said multiplication varying means.

60. In a balancing mechanism, a lever, load-supporting means and load-counterbalancing means each operatively connected to said lever, means for varying the degree of multiplication of said lever to establish a value for a unit of computation, means for utilizing said load-counterbalancing means to also maintain the zero-balance of said lever at any degree of multiplication, and means for controlling the zero-balance maintaining function of the load-counterbalancing means by said multiplication varying means.

61. In a balancing mechanism, a lever, load-supporting means and load counterbalancing means each operatively connected to said lever, means for varying the degree of multiplication of said lever to establish a value for a unit of computation, means for indicating the degree of multiplication of said lever, means for utilizing said load-counterbalancing means to also maintain the zero-balance of said lever at any degree of multiplication, and means for controlling the zero-balance maintaining function of the load-counterbalancing means by said multiplication varying means.

In testimony whereof, I affix my signature hereto.

WILLIAM R. MITTENDORF.